United States Patent [19]

Takahashi

[11] Patent Number: 4,955,081
[45] Date of Patent: Sep. 4, 1990

[54] LIGHT COMMUNICATION SYSTEM

[75] Inventor: Hiroshi Takahashi, Yokohama, Japan

[73] Assignee: Canon Kabushiki Kaisha, Tokyo, Japan

[21] Appl. No.: 240,489

[22] Filed: Sep. 6, 1988

Related U.S. Application Data

[63] Continuation of Ser. No. 939,309, Dec. 5, 1986, abandoned, which is a continuation of Ser. No. 570,811, Jan. 16, 1984, abandoned.

[30] Foreign Application Priority Data

Jan. 25, 1983 [JP] Japan .................................. 58-9376

[51] Int. Cl.$^5$ ............................................. H04B 10/04
[52] U.S. Cl. .................................... 455/608; 307/266; 328/58; 375/17; 455/613; 455/618
[58] Field of Search ............... 455/608, 613, 603, 618; 375/17; 328/58; 307/266

[56] References Cited

U.S. PATENT DOCUMENTS

| | | | |
|---|---|---|---|
| 2,535,061 | 12/1950 | Grieg | 375/22 |
| 2,605,409 | 7/1952 | Forbes | 328/58 |
| 3,018,390 | 1/1962 | Yourke | 307/266 |
| 3,796,831 | 3/1974 | Bauer | 455/613 |
| 3,867,648 | 2/1975 | Christenson | 307/266 |
| 4,006,304 | 2/1977 | Sell | 455/608 |
| 4,399,564 | 8/1983 | Cowen | 455/608 |

FOREIGN PATENT DOCUMENTS

| | | | |
|---|---|---|---|
| 54-152901 | 12/1979 | Japan | 455/608 |
| 57-13837 | 1/1982 | Japan | 455/608 |
| 58-38040 | 3/1983 | Japan | 455/608 |

OTHER PUBLICATIONS

Beguin–"Digitales Lichtwellenleiter"–Bulletin Technique PTT–7/1979 pp. 253–266.

*Primary Examiner*—Joseph A. Orsino
*Assistant Examiner*—L. Van Beek
*Attorney, Agent, or Firm*—Fitzpatrick, Cella, Harper & Scinto

[57] ABSTRACT

In a light communication system in which data to be transmitted is converted to an amplitude-modulated light signal which is radiated to a space, and the radiated light signal is received and demodulated to reproduce the original data, the amplitude-modulated light signal is transmitted only for a predetermined period shorter than a unit time of the data to be transmitted.

11 Claims, 2 Drawing Sheets

LIGHT COMMUNICATION SYSTEM

This application is a continuation of application Ser. No. 939,309 filed Dec. 5, 1986, which is a continuation of application Ser. No. 570,811 filed on Jan. 16, 1984 now both abandoned.

BACKGROUND OF THE INVENTION

1. Field of the Invention

The present invention relates to a light communication system, having a high transmission rate.

2. Description of the Prior Art

In the past, when digital signals "1" and "0" are light-transmitted, a light pulse at a predetermined frequency is sent for the signal "0", for example, and the light pulse is not sent for the signal "1". That is, a 100% modulation AM-modulation system is employed.

In such a system, a filter circuit which passes only a carrier frequency is used in a receiver to eliminate unnecessary light signals. However, since the filter circuit usually produces a gradually decaying output signal even after an input signal has disappeared, due to self-resonance, an apparent input signal period is longer than an actual input signal period. Accordingly, signals "1" and "0" which do not allow neglect of this delay time cannot be processed in this system. This restricts the rate of data transmission.

SUMMARY OF THE INVENTION

It is an object of the present invention to provide a light communication system which avoids the restriction on the highest transmission rate by, for example, a delay in a filter circuit to improve the transmission rate by shortening a transmission time to reflect an expansion of time in a receiver.

It is an aspect of the present invention to provide a light communication system comprising means for shortening a signal duration of data consisting of a signal train, and transmission means for light-modulating the data having the shortened signal duration.

It is another aspect of the present invention to provide a light communication system comprising means for shortening a signal duration of a data consisting of a signal train and means for transmitting the data having the shortened signal duration.

It is another aspect of the present invention to provide a communication system comprising series-connected storage means for transferring data consisting of a signal train, means for shortening a signal duration of the data to be shorter than the duration of outputs of the storage means and modulation means for modulating a carrier based on the shortened signal train.

It is another aspect of the present invention to provide a communication system comprising cascade-connected D-type flip-flops for receiving data consisting of a signal train, means for NORing outputs of the D-type flip-flops, means for modulating a carrier based on the output of the NOR means, and means for converting the signal produced by the modulation means to a light-signal.

DETAILED DESCRIPTION OF THE PREFERRED EMBODIMENTS

Figure 1:
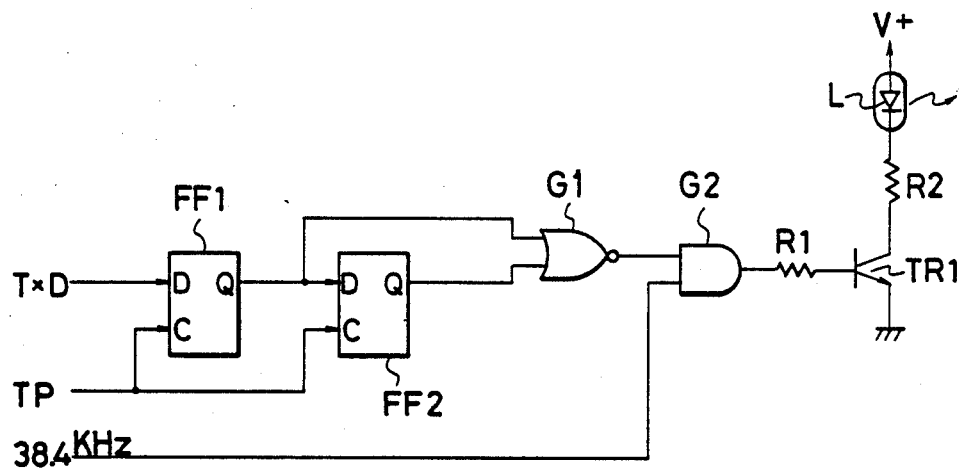
FIG. 1 a block diagram of a transmitter of a light communication system of the present invention.

FIG. 1 shows a block diagram of a light signal transmitter in accordance with the present invention. T×D denotes a digital signal which is a signal train of data to be transmitted, Tp denotes a clock pulse having a period of 200$\mu$ seconds, FF1 and FF2 denote D-type flip-flops, G1 denotes a NOR gate, G2 denotes an AND gate, TR1 denotes a transistor, L denotes a light emitting diode for converting a signal to light, and R1 and R2 denote resistors.

Figure 2:
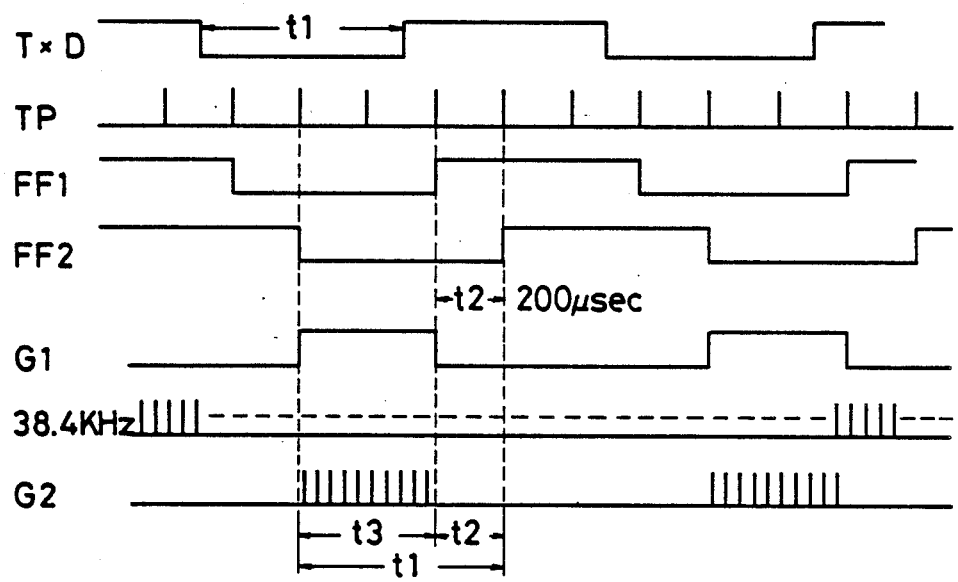
FIG. 2 shows signal waveforms for explaining the operation of FIG. 1.

The digital signal T×D to be transmitted is applied to an input terminal D of the D-type flip-flop FF1 and the clock pulse Tp is applied to an input terminal C. An output terminal Q of the D-type flip-flop FF1 is connected to an input terminal D of the D-type flip-flop FF2. The clock pulse Tp is applied to an input terminal C of the D-type flip-flop FF2. The Q-outputs of the D-type flip-flops FF1 and FF2 are supplied to input terminals of the NOR gate G1. An output of the NOR gate G1 is "1" when the outputs of both flip-flops are "0" as shown in FIG. 2. As a result, a "0"-level time of the digital signal T×D is shortened by 200$\mu$ seconds as shown in FIG. 2. The output of the NOR gate G1 is supplied to one input terminal of the AND gate G2 and a 38.4 KHz clock pulse is applied to the other input terminal of the AND gate G2. Thus, the 38.4 KHz clock pulse appears at the output terminal of the AND gate G2 for the period during which the output of the NOR gate G1 is "1", that is, for a period which is 200$\mu$ seconds shorter than the period during which the digital signal T×D is "0", as shown in FIG. 2. When the output of the AND gate G2 assumes "1", the transistor TR1 is rendered conductive through the resistor R1 and the light emitting diode L is energized through the resistor R2.

In this manner, the light emitting diode L is turned on and off repeatedly at the frequency of 38.4 KHz for the period which is 200$\mu$ seconds shorter than the "0" period of the digital signal T×D and hence the amplitude modulated light signal is produced and radiated into space.

Figure 3:
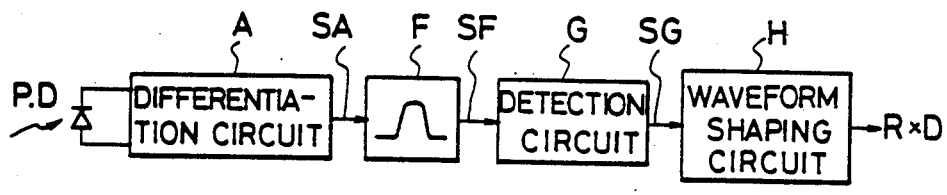
FIG. 3 is a block diagram of a receiver of the light communication system of the present invention.

FIG. 3 shows a circuit configuration of a receiver in the present invention. PD denotes a photo-diode which detects the light signal radiated into space, and A denotes a differentiation circuit for deriving a signal SA representing a change in a light intensity from an output electrical signal of the photo-diode PD. The output signal SA is supplied to a band-pass filter F which passes only the carrier at 38.4 KHz to provide a filter output, or the 38.4 KHz component SF. The output SF is supplied to a detection circuit G which detects a signal SG, which in turn is supplied to a waveform shaping circuit H to produce a digital signal R×D. The digital signal R×D includes the original data and it is processed as a conventional digital signal.

Figure 4:
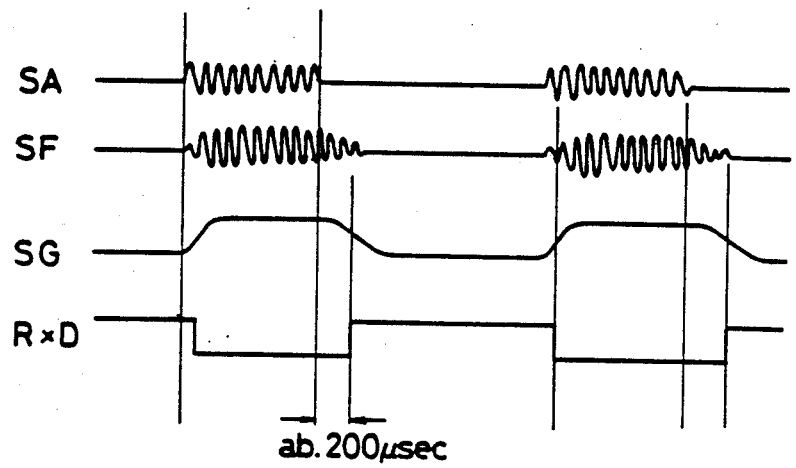
FIG. 4 shows signal waveforms for explaining the operation of FIG. 3.

The signal SF from the filter circuit F has a tail portion of approximately 200$\mu$ seconds as compared with the differentiated signal SA as shown in FIG. 4, and it is longer than an actual flash period of the light signal. However, in accordance with the present invention, since the transmitting light signal is previously corrected to compensate for the extended period of 200µ seconds, the digital signal R×D has a proper duration.

As described hereinabove, in accordance with the present invention, since the generation period of the transmitting light signal is previously shortened in the transmitter to compensate for the delay in the filter, the transmission rate is improved by the period corresponding to the delay in the filter, and the restriction to the transmission rate which has been a problem in the prior art system can be significantly avoided by the simple circuit configuration.

Alternatively, pulse generating means may be provided to shorten the pulse width of the pulse train.

I claim:

1. A communication system comprising:
   generating means for generating a signal train that includes an information portion represented by digital pulses;
   shortening means connected to said generating means for shortening a width of a digital pulse of the signal train by a predetermined constant width, the width of the shortened pulse corresponding to the width of the digital pulse of the signal train minus the predetermined constant width;
   transmission means connected to said shortening means for transmitting a signal train based on the shortened signal width from said shortening means; and
   reception means for receiving the signal train transmitted by said transmission means.

2. A communication system according to claim 1 wherein said transmission means includes means for transmitting a carrier modulated by the data pulses having the shortened width.

3. A communication system according to claim 1 wherein said transmission means includes means for converting the data pulses having the shortened width into a light signal.

4. A communication system according to claim 1 wherein said shortening means includes cascade-connected storage means.

5. A communication system comprising:
   serial-connected storage means for receiving and outputting a signal train comprising a plurality of pulses;
   shortening means connected to said storage means for shortening a width of a pulse of the signal train by a predetermined constant width, the width of the shortened pulse corresponding to the width of the pulse of the signal train minus the predetermined constant width;
   modulation and transmission means for modulating a carrier signal with the signal train based on the shortened signal width and for transmitting the carrier so modulated; and
   reception means for receiving the modulated carrier transmitted by said modulation and transmission means.

6. A communication system according to claim 5 further comprising means for converting the carrier modulated by said modulation means into a light signal.

7. A communication system according to claim 5 wherein said storage means are memories which receive clock signals.

8. A light communication system comprising:
   transmission means comprising:
   cascade-connected D-type flip-flops for receiving at inputs thereof a signal train that includes information represented by pulses,
   NOR means for NORing the outputs of said D-type flip-flops, thereby to shorten a width of a pulse of the signal train by a predetermined constant width,
   modulation means for modulating a carrier with data pulses based on the signal train, as output from said NOR means, and
   conversion means for converting the modulated carrier from said modulation means into a light signal; and
   reception means for receiving converted by said conversion means.

9. A light communication system comprising:
   output means for outputting a signal train comprising a plurality of pulses;
   shortening means connected to said output means for shortening a width of a pulse of the signal train by a predetermined constant width, the width of the shortened pulse corresponding to the width of the pulse of the signal train minus the predetermined constant width;
   transmission means for modulating a carrier signal with the signal train having a pulse with a width based on the shortened pulse width;
   conversion means connected to said transmission means for converting the signal from said transmission means into a light signal; and
   reception means for receiving information transmitted by said transmission means.

10. A light communication system comprising:
    output means for outputting a signal train comprising a plurality of pulses;
    shortening means connected to said output means for shortening a signal width of a pulse of the signal train by a predetermined constant width, said shortening means including series-connected memory elements having outputs connected a gate circuit;
    transmission means for modulating a carrier signal with the signal train having a pulse with a width based on the shortened pulse width;
    conversion means connected to said transmission means for converting the signal from said transmission means into a light signal; and
    reception means for receiving information transmitted by said transmission means.

11. A communication system comprising a transmitter and a receiver for receiving a signal transmitted from the transmitter, wherein said transmitter comprises:
    generating means for generating a signal train that includes an information portion represented by digital pulses;
    shortening means connected to said generating means for shortening a width of a digital pulse of the signal train by a predetermined constant width, the width of the shortened pulse corresponding to the width of the digital pulse of the signal train minus the predetermined constant width and
    transmission means connected to said shortening means for transmitting a signal train based on the shortened signal width from said shortening means to said receiver.

* * * * *

UNITED STATES PATENT AND TRADEMARK OFFICE
CERTIFICATE OF CORRECTION

PATENT NO. : 4,955,081
DATED : September 4, 1990
INVENTOR(S) : HIROSHI TAKAHASHI It is certified that error appears in the above-identified patent and that said Letters Patent is hereby corrected as shown below:

COLUMN 1

Line 12, "system," should read --system--.
Line 45, "a" (second occurrence) should be deleted.

COLUMN 4

Line 14, "receiving" should read --receiving the light signal--.
Line 40, "a" should read --to a--.
Line 62, "width" should read --width;--.

Signed and Sealed this

Eighth Day of June, 1993

Attest:

MICHAEL K. KIRK

Attesting Officer

Acting Commissioner of Patents and Trademarks